United States Patent
Lyons et al.

(10) Patent No.: US 11,200,919 B2
(45) Date of Patent: Dec. 14, 2021

(54) PROVIDING A USER INTERFACE FOR VIDEO ANNOTATION TOOLS

(71) Applicant: Sony Group Corporation, Tokyo (JP)

(72) Inventors: Gary Lyons, San Diego, CA (US); Kenji Suzuki, Tokyo (JP); Brent Faust, San Diego, CA (US); Kevin Barnes, San Diego, CA (US); Jong Hwa Lee, San Diego, CA (US)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/814,056

(22) Filed: Mar. 10, 2020

(65) Prior Publication Data

US 2021/0287718 A1   Sep. 16, 2021

(51) Int. Cl.
  *G06F 3/048*   (2013.01)
  *G11B 27/34*   (2006.01)
  *G06F 3/0484*   (2013.01)
  *G06K 9/00*   (2006.01)

(52) U.S. Cl.
  CPC .......... *G11B 27/34* (2013.01); *G06F 3/04847* (2013.01); *G06K 9/00765* (2013.01)

(58) Field of Classification Search
  CPC .. G11B 27/34; G06F 3/04847; G06K 9/00765
  See application file for complete search history.

(56) References Cited

U.S. PATENT DOCUMENTS

| | | | |
|---|---|---|---|
| 7,929,775 B2 | 4/2011 | Hager | |
| 8,363,109 B2 | 1/2013 | Dunkel | |
| 8,826,357 B2 | 9/2014 | Fink | |
| 9,814,392 B2 | 11/2017 | Balicki | |
| 2009/0122058 A1 | 5/2009 | Tschesnok | |
| 2014/0105573 A1* | 4/2014 | Hanckmann | H04N 5/91 386/241 |
| 2015/0139610 A1* | 5/2015 | Syed | G11B 27/11 386/241 |
| 2019/0311192 A1* | 10/2019 | Murphy | H04N 7/18 |

OTHER PUBLICATIONS

Jiande Sun, Yufei Wang and Jing Li; Gait Recognition; https://www.intechopen.com/books/motion-tracking-and-gesture-recognition/gait-recognition.

* cited by examiner

*Primary Examiner* — Pei Yong Weng
(74) *Attorney, Agent, or Firm* — Trellis IP Law Group, PC

(57) ABSTRACT

Implementations generally provide a user interface for video annotation tools. In some implementations, a method includes obtaining at least one video of at least one object performing at least one action displaying one or more portions of the at least one video in a user interface. The method further includes displaying a plurality of annotation tracks in the user interface, where each annotation track of the plurality of annotation tracks is associated with one or more of the at least one object and the at least one action in the at least one video. The method further includes obtaining one or more annotations associated with the at least one video based on the plurality of annotation tracks.

20 Claims, 9 Drawing Sheets

PROVIDING A USER INTERFACE FOR VIDEO ANNOTATION TOOLS

CROSS REFERENCE TO RELATED APPLICATIONS

This application is related to U.S. Patent Application Ser. No. 16/814,056, entitled "PROVIDING A 2-DIMENSIONAL DATASET FROM 2-DIMENSIONAL and 3-DIMENSIONAL COMPUTER VISION TECHNIQUES," filed Mar. 10, 2020, which is hereby incorporated by reference as if set forth in full in this application for all purposes.

BACKGROUND

Some security systems are able to capture videos of a person, analyze movements of the person, and generate an image or video dataset of metadata. To identify human actions captured by security camera videos of the system, a person needs to manually annotate the videos. This may be time consuming where the positions and angles of the video cameras may vary and might not provide adequate coverage. Multiple cameras may be used in a controlled environment. However, subjects, movements, and background variation may still be substantially limited. Another solution uses computer graphics as a dataset source. However, this approach is expensive, and data may be proprietary. Conventional annotation tools may be used to review human actions in videos. However, such annotation tools are not intuitive to use and require much time for users to identify and annotate actions captured in the videos.

SUMMARY

Implementations generally provide a user interface for video annotation tools. In some implementations, a system includes one or more processors, and includes logic encoded in one or more non-transitory computer-readable storage media for execution by the one or more processors. When executed, the logic is operable to cause the one or more processors to perform operations including: obtaining at least one video of at least one object performing at least one action; displaying one or more portions of the at least one video in a user interface; displaying a plurality of annotation tracks in the user interface, where each annotation track of the plurality of annotation tracks is associated with one or more of the at least one object and the at least one action in the at least one video; and obtaining one or more annotations associated with the at least one video based on the plurality of annotation tracks.

With further regard to the system, in some implementations, the logic when executed is further operable to cause the one or more processors to perform operations including: parsing the at least one video into a plurality of segments; identifying one or more segments for the at least one object; and associating each of the one or more segments with the at least one object. In some implementations, the logic when executed is further operable to cause the one or more processors to perform operations including: parsing the at least one video into a plurality of segments; identifying one or more segments for the at least one action; and associating each of the one or more segments with the at least one action. In some implementations, the logic when executed is further operable to cause the one or more processors to perform operations including enabling a user to selectively annotate one or more of the at least one object and the at least one action in the at least one video based on at least one corresponding annotation track of the plurality of annotation tracks. In some implementations, the at least one video includes a plurality of videos, and the logic when executed are further operable to cause the one or more processors to perform operations including enabling a user to annotate a plurality of videos of a same object to provide the one or more annotations. In some implementations, the logic when executed is further operable to cause the one or more processors to perform operations including generating training data from the at least one video and the one or more annotations. In some implementations, the one or more annotations include one or more of object information, localization information, and action information.

In some embodiments, a non-transitory computer-readable storage medium with program instructions thereon is provided. When executed by one or more processors, the instructions are operable to cause the one or more processors to perform operations including: obtaining at least one video of at least one object performing at least one action; displaying one or more portions of the at least one video in a user interface; displaying a plurality of annotation tracks in the user interface, where each annotation track of the plurality of annotation tracks is associated with one or more of the at least one object and the at least one action in the at least one video; and obtaining one or more annotations associated with the at least one video based on the plurality of annotation tracks.

With further regard to the computer-readable storage medium, in some implementations, the instructions when executed are further operable to cause the one or more processors to perform operations including: parsing the at least one video into a plurality of segments; identifying one or more segments for the at least one object; and associating each of the one or more segments with the at least one object. In some implementations, the instructions when executed are further operable to cause the one or more processors to perform operations including: parsing the at least one video into a plurality of segments; identifying one or more segments for the at least one action; and associating each of the one or more segments with the at least one action. In some implementations, the instructions when executed are further operable to cause the one or more processors to perform operations including enabling a user to selectively annotate one or more of the at least one object and the at least one action in the at least one video based on at least one corresponding annotation track of the plurality of annotation tracks. In some implementations, the at least one video includes a plurality of videos, and the instructions when executed are further operable to cause the one or more processors to perform operations including enabling a user to annotate a plurality of videos of a same object to provide the one or more annotations. In some implementations, the instructions when executed are further operable to cause the one or more processors to perform operations including generating training data from the at least one video and the one or more annotations. In some implementations, the one or more annotations include one or more of object information, localization information, and action information.

In some implementations, a method includes: obtaining at least one video of at least one object performing at least one action; displaying one or more portions of the at least one video in a user interface; displaying a plurality of annotation tracks in the user interface, where each annotation track of the plurality of annotation tracks is associated with one or more of the at least one object and the at least one action in the at least one video; and obtaining one or more annotations associated with the at least one video based on the plurality of annotation tracks.

With further regard to the method, in some implementations, the method further includes: parsing the at least one video into a plurality of segments; identifying one or more segments for the at least one object; and associating each of the one or more segments with the at least one object. In some implementations, the method further includes: parsing the at least one video into a plurality of segments; identifying one or more segments for the at least one action; and associating each of the one or more segments with the at least one action. In some implementations, the method further includes enabling a user to selectively annotate one or more of the at least one object and the at least one action in the at least one video based on at least one corresponding annotation track of the plurality of annotation tracks. In some implementations, the at least one video includes a plurality of videos, and the method further includes enabling a user to annotate a plurality of videos of a same object to provide the one or more annotations. In some implementations, the method further includes generating training data from the at least one video and the one or more annotations.

A further understanding of the nature and the advantages of particular implementations disclosed herein may be realized by reference of the remaining portions of the specification and the attached drawings.

DETAILED DESCRIPTION

Embodiments described herein enable, facilitate, and manage the creation of a synthetic 2-dimensional (2D) dataset using 2D and 3-dimensional (3D) computer vision techniques. Embodiments combine existing 3D reconstruction techniques and computer vision techniques to generate the 2D dataset. Embodiments generate the 2D dataset with arbitrary points of view from multiple angle 2D cameras. Embodiments also provide a user interface for video annotation tools.

In various embodiments, a system obtains 2D videos of a subject performing one or more actions. The system then generates a 3D model based on the 2D videos, and then generates a 3D scene based on the 3D model. The system then generates a 2D dataset based on the 3D scene. Although embodiments disclosed herein are described in the context of subjects being humans, these embodiments may also apply to other subjects such as animals, smart mechanical devices, etc. that may perform actions. The 2D dataset may be used for training in the context of machine learning or deep learning.

In various embodiments, a system obtains at least one video of at least one object or subject performing one or more actions. The system displays one or more portions of the video in a user interface. The system also displays annotation tracks in the user interface, where each annotation track is associated with one or more observed subjects and with at least one action in the video. In various embodiments, the system obtains one or more annotations associated with the video and based on the user interaction with the annotation tracks. Although embodiments disclosed herein are described in the context of subjects being humans, these embodiments may also apply to other objects such as animals, smart mechanical devices, etc. that may perform actions.

Figure 1:
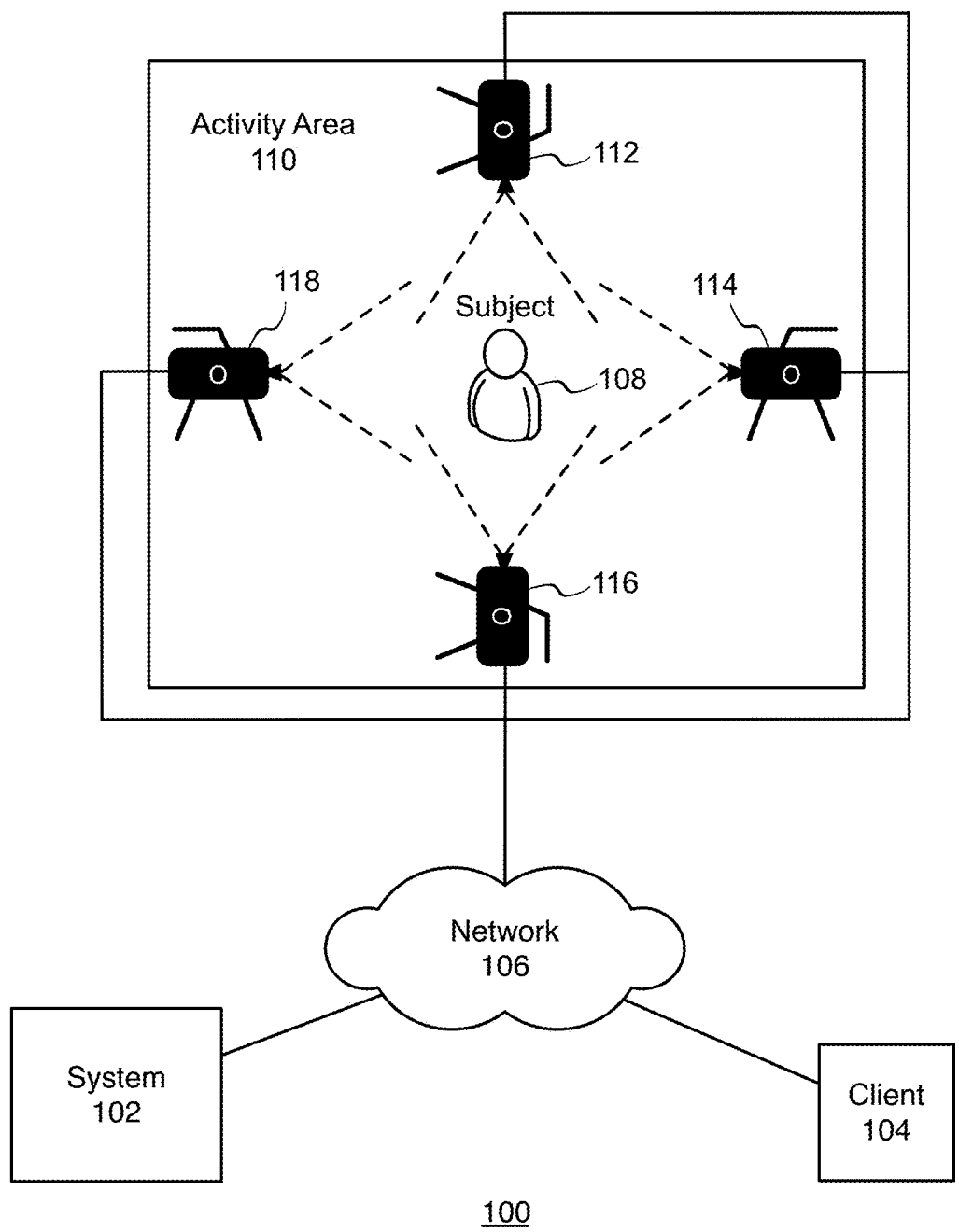
FIG. 1 is a block diagram of an example environment for generating a 2D dataset using 2D and 3D computer vision techniques and for providing a user interface for video annotation tools, which may be used for implementations described herein.

FIG. 1 is a block diagram of an example activity environment 100 for generating a 2D dataset using 2D and 3D computer vision techniques and for providing a user interface for video annotation tools, which may be used for implementations described herein. In some implementations, environment 100 includes a system 102, which communicates with a client 104 via a network 106. Network 106 may be any suitable communication network such as a Wi-Fi network, Bluetooth network, the Internet, etc.

As shown, system 102 monitors the activity of a subject 108 in an activity area 110 using physical video cameras 112, 114, 116, and 118, which capture video of subject 108 at different angles. In various embodiments, physical video cameras 112, 114, 116, and 118 are positioned at arbitrary locations in order to capture multiple videos and/or still images at different points of view of the same subject. The terms cameras and video cameras may be used interchangeably.

Subject 108 may also be referred to as a person 108 or target user 108. In various embodiments, system 102 may utilize deep machine learning and computer vision techniques to detect and measure the body positions and movements of subject 108. As described in more detail herein, embodiments generate a 2D dataset with arbitrary points of view from 2D multiple-angle cameras. Embodiments combine existing 3D reconstruction techniques and computer vision techniques to generate the 2D dataset. Embodiments may be applied in various contexts such as for content creation for games or entertainment. For example, the system may capture players' 3D models in a game facility, where players use 3D models as their avatars in 3D game space. Embodiments may also expand annotations for 3D video and/or virtual reality content in addition to 2D video.

For ease of illustration, FIG. 1 shows one block for each of system 102, client 104, network 106, and activity area 110. Blocks 102, 104, 106, and 110 may represent multiple systems, client devices, networks, and activity areas. Also, there may be any number of people/subjects on a given activity area. In other implementations, environment 100 may not have all of the components shown and/or may have other elements including other types of elements instead of, or in addition to, those shown herein.

While system 102 performs embodiments described herein, in other embodiments, any suitable component or combination of components associated with system 102 or any suitable processor or processors associated with system 102 may facilitate performing the embodiments described herein.

Figure 2:
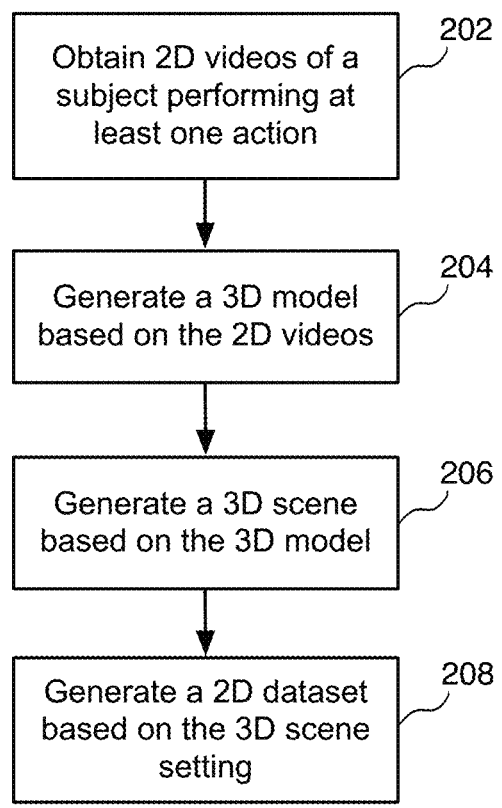
FIG. 2 is an example flow diagram for generating a 2D dataset using 2D and 3D computer vision techniques, according to some implementations.

FIG. 2 is an example flow diagram for generating a 2D dataset using 2D and 3D computer vision techniques, according to some implementations. Referring to both FIGS. 1 and 2, a method is initiated at block 202, where a system such as system 102 obtains 2D videos of a subject performing at least one action. In various embodiments, the system captures multiple, synchronized 2D videos by positioning multiple cameras (e.g., physical video cameras 112, 114, 116, 118, etc.) at arbitrary points of view relative to the same subject (e.g., subject 108). Further example embodiments directed to obtaining 2D videos of a subject performing at least one action are described in more detail below.

At block 204, the system generates a 3D model based on the 2D videos. Further example embodiments directed to generating a 3D model based on the 2D videos are described in more detail below.

At block 206, the system generates a 3D scene based on the 3D model. The following description provides example embodiments involved in the generation of a 3D scene, which is used for generating a 2D dataset.

Figure 3:
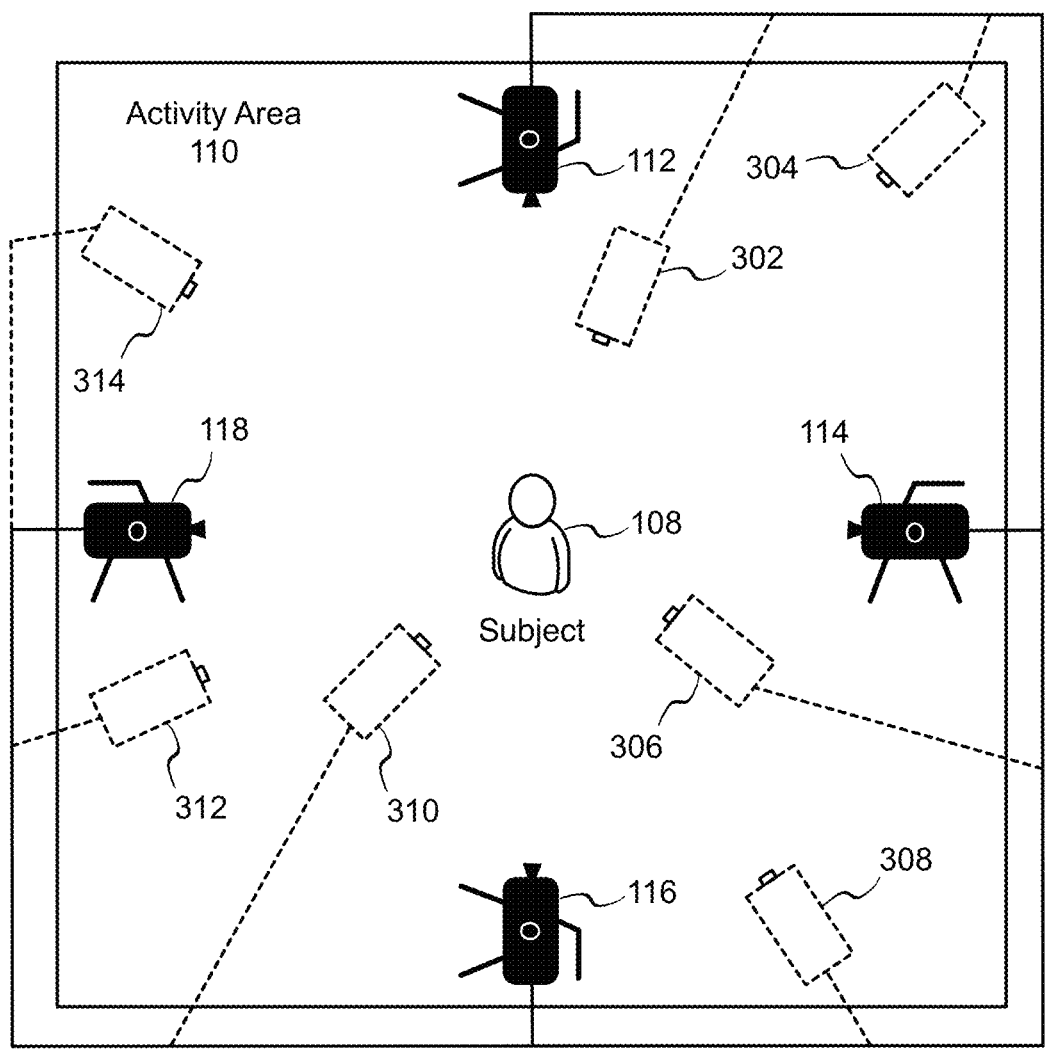
FIG. 3 is a block diagram of an example environment for generating a 2D dataset using 2D and 3D computer vision techniques, including virtual cameras, which may be used for implementations described herein.

FIG. 3 is a block diagram of an example environment 300 for generating a 2D dataset using 2D and 3D computer vision techniques, including virtual cameras, which may be used for implementations described herein.

Shown are physical video cameras 112, 114, 116, and 118, which are capturing videos of subject 108 at different angles. Also shown are virtual video cameras 302, 304, 306, 308, 310, 312, and 314. While 4 physical video cameras and 7 virtual video cameras are shown, the actual number physical and virtual video cameras may vary and will depend on the particular implementation.

In various embodiments, the positions and angles of physical video cameras 112, 114, 116, and 118 are limited and might not provide adequate coverage of subject 108 due to their limited numbers. The system may also generate as many virtual video cameras as needed to provide adequate coverage of subject 108. Also, the system may position the virtual cameras in many different locations and angles. As such, if subject 108 picks up an object, the existing physical video cameras and any number of virtual video cameras are available and positioned at different viewpoints to capture video of subject 108 performing the action. For example, if no physical video camera is in front of subject 108, the system may generate and add multiple virtual video cameras (e.g., virtual video cameras 310, 312, etc.) at various different positions to capture subject 108 from different angles. The system may generate an infinite number of virtual cameras, and then capture video footage of subject 108 performing different actions at different s and in different locations and positions in activity area 110. Further example embodiments directed to generating a 3D scene based on the 3D model are described in more detail below.

At block 208, the system generates a 2D dataset based on the 3D scene. In various embodiments, the system generates the 2D dataset with arbitrary points of view from multiple-angle 2D videos. As described in more detail below, the system combines existing 3D reconstruction techniques and computer vision techniques to generate the 2D dataset. Further example embodiments directed to generating a 2D dataset based on the 3D scene are described in more detail below.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 4:
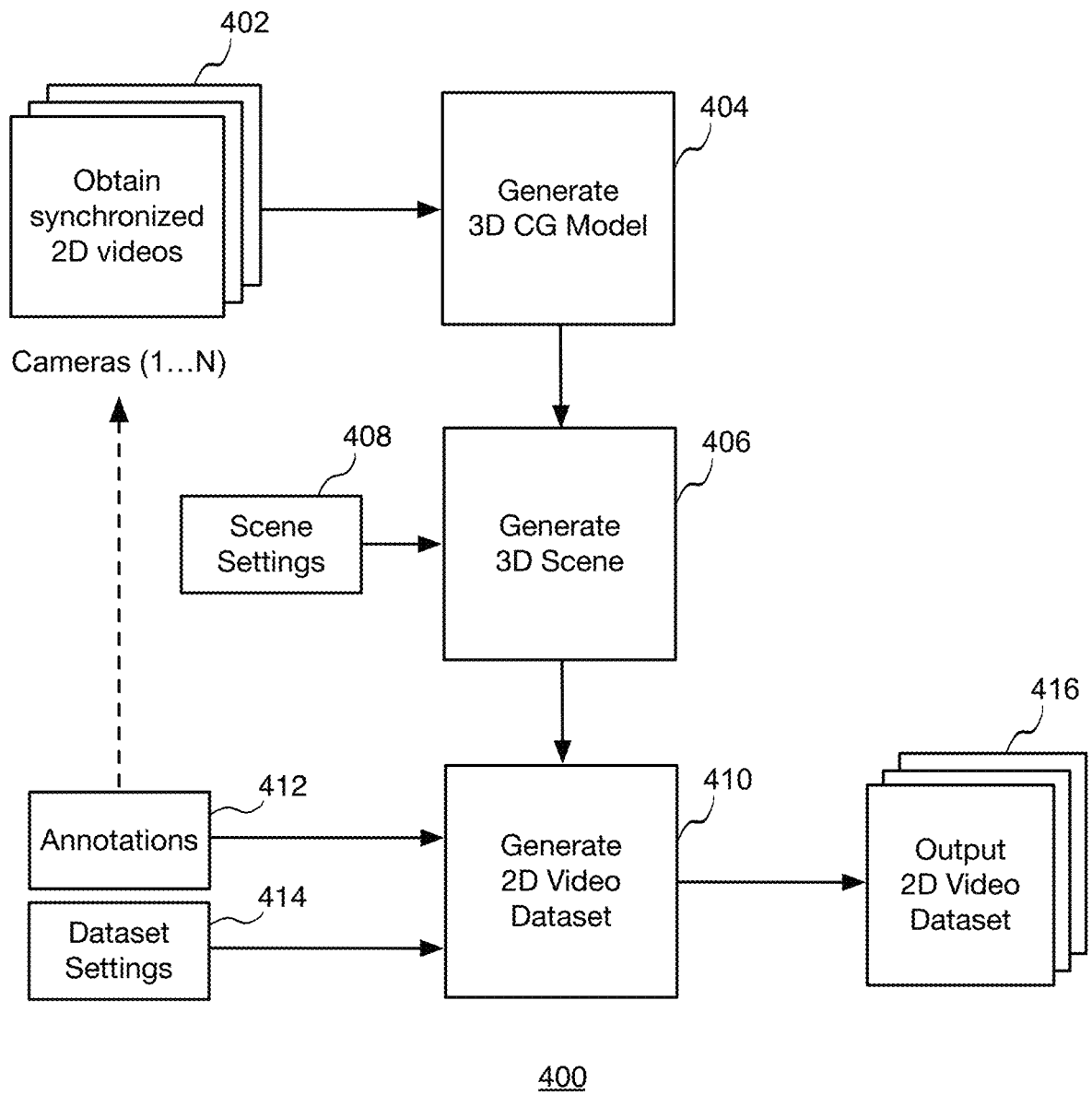
FIG. 4 is an example flow diagram for generating a 2D dataset using 2D and 3D computer vision techniques, according to some implementations.

FIG. 4 is an example flow diagram for generating a 2D dataset using 2D and 3D computer vision techniques, according to some implementations. Referring to both FIGS. 1 and 4, a method is initiated at block 402, where a system such as system 102 obtains 2D videos of a subject performing at least one action. In various embodiments, the 2D videos are synchronized. In various embodiments, the synchronized 2D videos are multiple 2D videos that have the same time start time and end time. In various embodiments, the 2D videos are obtained from physical video cameras 1 to N (e.g., cameras 112, 114, 116, 118, etc.) that are positioned at arbitrary locations in the physical environment. As such, these videos record the same scene or same subjects at different angles. As described in more detail herein, in various embodiments, the system obtains one or more annotations associated with the 2D videos. The system may receive the annotations from a user.

At block 404, the system generates a 3D computer graphics (CG) model based on the 2D videos. In various embodiments, the 3D model may be stored on a main server or in the cloud, depending upon the particular implementation. In various embodiments, the system determines one or more model data modifications to the 3D model data of the 3D model. For example, in various embodiments, the system determines modifications to the 3D model based on scene settings. Example scene settings may include custom backgrounds, 3D objects, filters, changing camera parameters, position angle or movements of camera, etc.

The system then applies the one or more model data modifications to the 3D model data. In various embodiments, the 3D CG generation process may include 3D scene/object reconstruction from 2D images/videos. The 3D information may be described as 3D OBJ format or point cloud format. The pipeline may use 3D reconstruction techniques in the market (e.g., structure from motion, etc.).

At block 406, the system generates a 3D scene based on the 3D model, which may include 3D movie edits. As described above in connection with FIG. 3, the system generates one or more virtual video cameras. This enables the system to capture any number of videos of a given subject from multiple different angles. The system may then generate the 3D scene. As described in more detail below, the system uses the various virtual camera positions to generate 2D training data from 3D models and 3D scenes. The system may store this 2D training data on a server or in the cloud, depending upon the implementation.

In various embodiments, the system determines one or more scene settings (e.g., scene settings 408). In various embodiments, the system generates a 3D scene based on one or more of the scene settings. Examples scene settings may include virtual camera settings (e.g., number of cameras, positions, angles, etc.), 3D background information, and other 3D models. Each scene setting describes how to modify or edit the 3D scene for the dataset. For example, a user may want to change or customize a background and/or remove unnecessary objects from the 3D scene. In various embodiments, a scene setting may include custom backgrounds, 3D objects, and filters to modify 3D scenes. In various embodiments, a scene setting may include a number of virtual camera number, identifiers of each virtual camera, and may include changing camera parameters position, angles, and/or movements. In various embodiments, a scene setting may include camera settings (e.g., aperture, zooming, etc.).

In various embodiments, the system generates one or more virtual cameras. The system the adds one or more virtual cameras to the 3D scene set based on the scene settings. As described herein, the system uses the combination of physical video cameras and virtual video cameras to capture videos of a given subject from multiple different angles.

In various embodiments, the system generates the 3D scene and provides a 3D movie edit process to fix errors and to modify scenes and/or objects (e.g., adds, removes, etc.) against generated 3D CG data. In this process, the system also adds virtual cameras that are specified by the scene settings, as described herein. In various implementations, this process may be performed with any suitable 3D CG editor.

At block 410, the system generates a 2D video dataset based on the 3D scene. In various embodiments the 2D dataset is a video dataset that includes 2D training data. The system may store the 2D dataset on a server or in the cloud, depending on the particular implementation.

In various embodiments, the system obtains one or more annotations associated with the 2D videos, which are to be included in or applied to the 2D dataset. Such annotations may include various descriptions of subjects including objects in a video (e.g., labels of each subject and/or object, etc.). The particular types of annotations and content in the annotations may vary, and will depend on the particular implementation. The system applies the one or more annotations to the 2D dataset.

In various embodiments, the 2D dataset is based on annotations 412 and dataset settings 414. The 2D dataset may include generated 2D videos and generated annotations. The system utilizes dataset settings 414 for outputting one or more dataset configurations. Dataset configuration may include dataset file formats, filters, etc., for example.

Annotations 412 may include metadata that describes various aspects of synchronized 2D videos. For example, annotations may include actions, object types, object location, time segments, etc. In some embodiments, an annotation may be created by outside of the system. For example, an annotation may describe who or what is in the synchronized 2D videos. In another example, an annotation may describe human actions or object locations.

The system matches generated 2D videos and generated annotations with virtual camera settings for 2D video dataset generation. For example, if input annotation contains location (x, y) of objects/subjects, generated annotations may have transformed coordination based on the virtual camera settings.

In various embodiments, dataset settings 414 may specify one or more output dataset configurations. For example, users can specify dataset file format or filters to narrow down data. Example dataset settings may include the dataset file format, the output quality, etc.

At block 416, the system outputs the 2D video dataset. In various embodiments, the 2D video dataset may include 2D videos, which are generated from virtual cameras and annotation files which are transformed from input annotation files corresponding to generated 2D videos. For example, if input annotation data includes subject position in input 2D videos, the 2D dataset should have transformed subject positions corresponding to virtual camera settings (position/angle etc.).

In some embodiments, in order to train a deep learning model, the system processes both raw data and annotations. For example, there may be a 2D image of a person picking up an object. There may also be one or more annotations (e.g., "picking up object," etc.). The system may use pairings (subject, action) to train a deep learning model. The deep learning model may be subsequently used with an input of a 2D image and may output "picking up object," presuming the 2D image is of someone picking up an object.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 5:
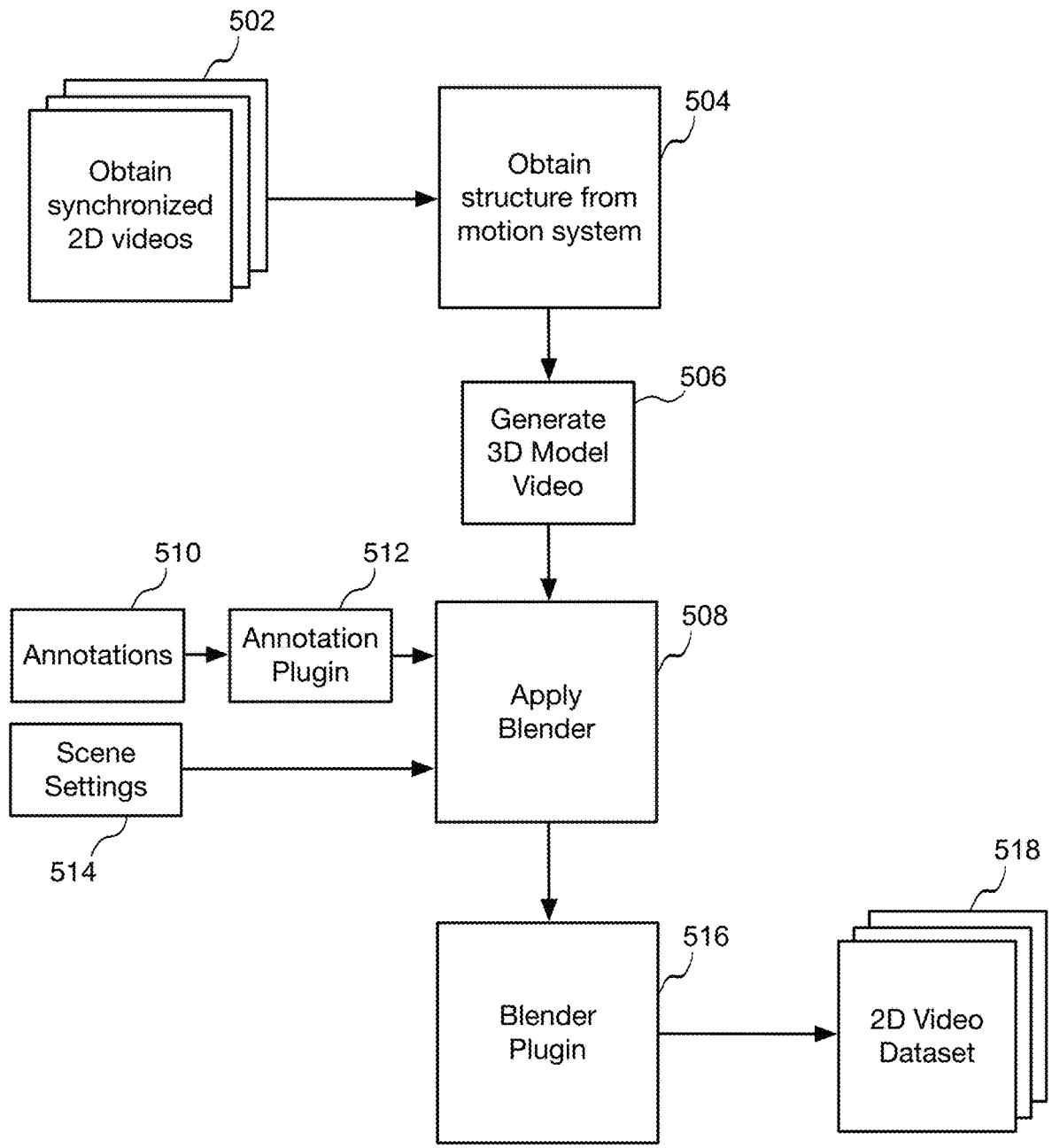
FIG. 5 is an example flow diagram for generating a 2D dataset using 2D and 3D computer vision techniques, according to some implementations.

FIG. 5 is an example flow diagram for generating a 2D dataset using 2D and 3D computer vision techniques, according to some implementations. Referring to both FIGS. 1 and 5, a method is initiated at block 502, where a system such as system 102 obtains synchronized 2D videos. At block 504, the system obtains a structure from a motion system. In some embodiments, the system may access the motion system from a third-party vendor. At block 506, the system generates a 3D model video.

At block 508, the system applies a blender or video editor. In various embodiments, the system may apply the blender based on annotations 510 (e.g., labels, locations including object IDs, time segments, etc.), which are input to an annotation plugin 512. The system may also apply the blender based on scene settings 514. Example scene settings may include virtual camera settings (e.g., number of cameras, positions, angles, etc.), background, other 3D models, etc. At block 516, the system applies a blender plugin. At block 518, the system outputs the 2D video dataset.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 6:
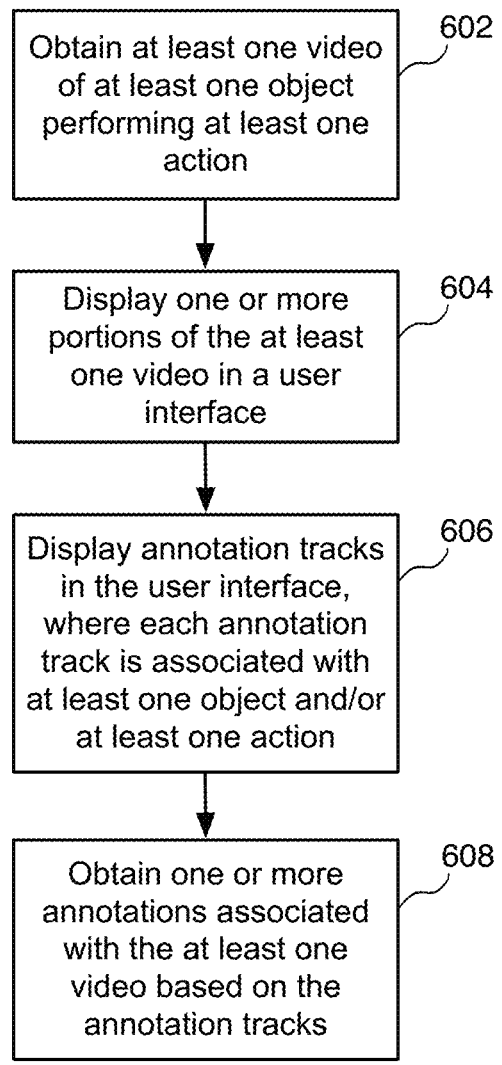
FIG. 6 is an example flow diagram for providing a user interface for video annotation tools, according to some implementations.

FIG. 6 is an example flow diagram for providing a user interface 700 for video annotation tools, according to some implementations. As described in more detail herein, user interface 700 provides a user with a video preview and a localization editor, which facilitates a user in adding annotations including metadata to time-based data such as videos or audio. A method is initiated at block 602, where a system such as system 102 obtains at least one video of at least one object performing at least one action. As indicated above, the system may capture multiple, synchronized 2D videos by positioning multiple physical video cameras and multiple virtual video cameras at arbitrary points of view of the same subject.

At block 604, the system displays one or more portions of the at least one video in a user interface. Such portions may include subjects and/or objects that appear in the video. As described in more detail herein, the system tracks objects and actions in a video for reviewing, adding annotations including time-based metadata.

Figure 7:
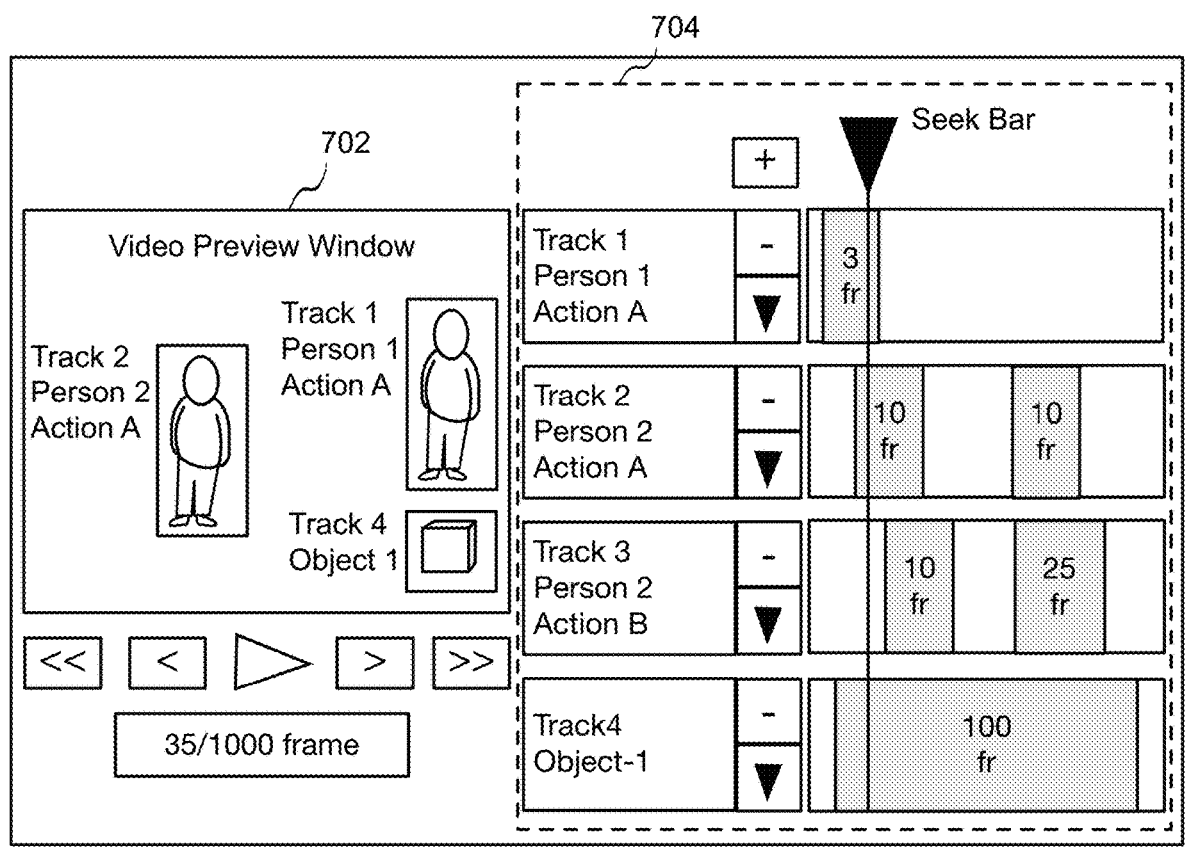
FIG. 7 is an example user interface for video annotation tools, according to some implementations.

FIG. 7 is an example user interface for video annotation tools, according to some implementations. Shown is a video preview window 702, which includes 3 objects including a Person 1 doing an Action A, a Person 2 doing an Action A, and a Object 1. The actions of the people or subjects may vary (e.g., sitting, standing, stepping, etc.), and will depend on the particular implementation.

In various embodiments, the system parses the at least one video into segments. In various embodiments, the system identifies one or more segments for each of the objects, and then associates each of the one or more segments with each of the corresponding objects. In various embodiments, the system also identifies one or more segments for each of the actions, and then associates each of the one or more segments with each of the corresponding actions. For example, in various embodiments, the system enables each object including Persons 1 and 2, and Object 1 to be delineated from other objects. In some embodiments, the system may enable a user to place a bounding box around each object. In some embodiments, the system may automatically without user intervention place a bounding box around each object using any suitable object recognition techniques. In various embodiments, the system may use the bounding box to segment and group segments of particular objects, actions, etc.

In various embodiments, the system provides various controls (e.g., play, reverse, forward, etc.), which enable a user to navigate to different frames of the video. In some embodiments, the system may also display the particular frame (e.g., frame 35, etc.) and the number of frames in the video (e.g., 1,000 frames, etc.).

At block 606, the system displays annotation tracks in the user interface. In various embodiments, each annotation track of the annotation tracks is associated with one or more of the at least one object and the at least one action in the at least one video. Referring still to FIG. 7, also shown is a section 704 of user interface 700. Section 704 includes annotation tracks (e.g., Track 1, Track 2, Track 3, Track 4, etc.), where each annotation track is associated with a different object (e.g., Person 1, Person 2, Object 1, etc.). In addition to the annotation track identifier (e.g., Track 1, etc.) and object identifier (e.g., Person 1, etc.), each annotation track also indicates an action (e.g., Action A, etc.) if appropriate. For example, the action of Person 2 may be standing.

In various embodiments, the system may generate and associate multiple annotation tracks with a given object. For example, as shown, Track 2 is associated with Person 2 performing Action A (e.g., Person 2 standing in front of Object 1, etc.). In another example, Track 3 is associated with Person 2 performing Action B (e.g., Person 2 picking up Object 1, etc.). The system may also enable a user to add or remove annotation tracks from section 704. The system may also enable a user to play, review, and add/remove/modify annotation tracks and annotations.

Also shown is a seek bar that enables a user to navigate to any given frame of an annotation track. For example, as shown, the seek bar is placed at Tracks 1, 2, and 4 at moments in the video where frames show objects. For example, the seek bar is placed at a location in the video timeline corresponding to Track 1, Person 1, Action A, which takes up 3 frames as indicated. The seek bar is also placed at a location in the video timeline corresponding to Track 2, Person 2, Action A, which takes up 10 frames as indicated. The seek bar is also placed at a location in the video timeline corresponding to Track 4, Object 1, which takes up 100 frames as indicated.

In various embodiments, the system may indicate how many annotation tracks exist on an entire, given video. As indicated herein, each annotation track shows annotations (metadata) describing objects including subjects, and associated actions. Each annotation track also shows such objects and the frames at which the metadata starts and ends. For an object that is a person, such annotations may include human actions such as "waving hands," "walking," etc., depending on the particular implementation. For an object that is inanimate, such annotations may include object status such as "turned-on," "used," "exists," etc., depending on the particular implementation.

The annotation tracks helps in creating training data that would be used later for automatic detection of particular objects. For example, if the subject is waving his or her hands and is walking, the system enables the addition of both metadata in connection hand waving and metadata in connection with walking. The system enables the metadata to be manipulated in user interface 700 using any suitable input device (e.g., touchpad, pointing device, keyboard, etc.). For example, a tool may support a drag-and-drop segment to modify start- and/or end-locations.

In various embodiments, the system enables a user to selectively annotate one or more of the at least one object and the at least one action in the at least one video based on at least one corresponding annotation track. In various embodiments, the system enables a user to add annotations including metadata about each object. In various embodiments, while the system enables a user to annotate one or more of multiple videos of the same object to provide various annotations, the system associates the annotations with each object. In some embodiments, the system may automatically add and associate some annotations without user intervention to each object. For example, the system may determine and indicate a particular frame number or frame numbers that correspond to moments in the video where a particular object (e.g., Person 2, etc.) is performing a particular action (e.g., Action A, etc.) up another object (e.g., Object 1).

In various embodiments, the system generates training data from the at least one video and the one or more annotations. In various embodiments, the one or more annotations include one or more of object information, localization information, and action information.

In some embodiments, annotations may include whether a particular object (e.g., Person 2) is a main target subject to be observed and tracked. Annotations may also include whether a particular object is being acted upon (e.g., Object 1). For example, the system may track Person 2 walking over to Object 1, picking up Object 1, and then handing Object 1 to Person 1 or placing object 1 on a surface such as on a table (not shown).

Embodiments reduce a user effort in annotating time-based data (e.g., video, audio, etc.) with metadata. Embodiments utilize a track-based user interface, also referred to as an annotation track user interface (UI). The user interface facilitates a user in reviewing and annotating videos, which may include human actions and object status. Embodiments may be applied to editing annotations in virtual reality environments.

In various embodiments, the system may utilize machine learning in facilitating a user in reviewing a dataset and its annotations. In various embodiments, in addition to the various examples of annotations provided herein, annotations may also include time-based metadata (e.g., time stamps, frame numbers, beginning frames, ending frames associated with or linked to particular subjects and actions, etc.).

At block 608, the system obtains one or more annotations associated with the at least one video based on the annotation tracks. The system may store the annotations locally at the system or at the client device or other suitable and accessible storage location.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 8:
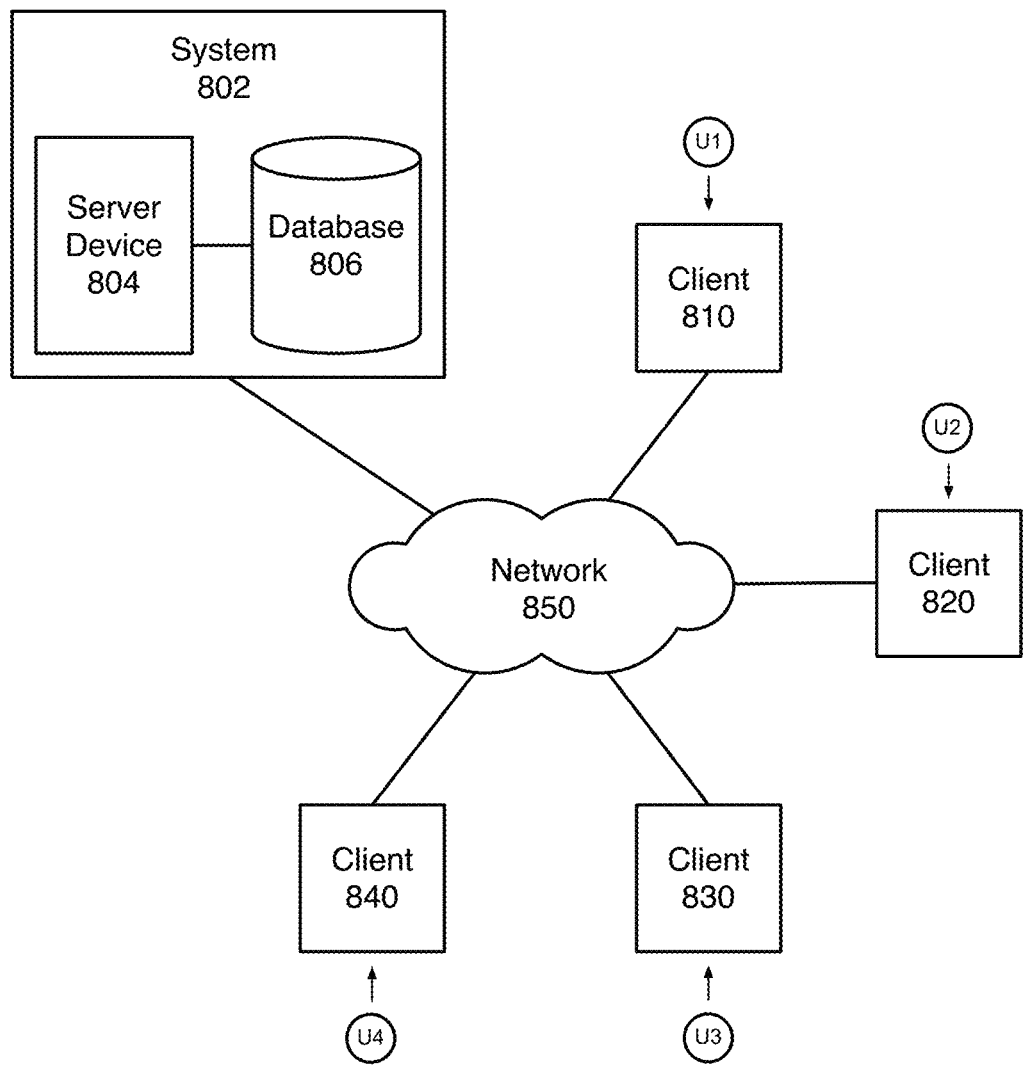
FIG. 8 is a block diagram of an example network environment, which may be used for some implementations described herein.

FIG. 8 is a block diagram of an example network environment 800, which may be used for some implementations described herein. In some implementations, network environment 800 includes a system 802, which includes a server device 804 and a database 806. For example, system 802 may be used to implement system 102 of FIG. 1, as well as to perform embodiments described herein. Network environment 800 also includes client devices 810, 820, 830, and 840, which may communicate with system 802 and/or may communicate with each other directly or via system 802. Network environment 800 also includes a network 850 through which system 802 and client devices 810, 820, 830, and 840 communicate. Network 850 may be any suitable communication network such as a Wi-Fi network, Bluetooth network, the Internet, etc.

For ease of illustration, FIG. 8 shows one block for each of system 802, server device 804, and network database 806, and shows four blocks for client devices 810, 820, 830, and 840. Blocks 802, 804, and 806 may represent multiple systems, server devices, and network databases. Also, there may be any number of client devices. In other implementations, environment 800 may not have all of the components shown and/or may have other elements including other types of elements instead of, or in addition to, those shown herein.

While server device 804 of system 802 performs embodiments described herein, in other embodiments, any suitable component or combination of components associated with system 802 or any suitable processor or processors associated with system 802 may facilitate performing the embodiments described herein.

In the various embodiments described herein, a processor of system 802 and/or a processor of any client device 810, 820, 830, and 840 cause the elements described herein (e.g., information, etc.) to be displayed in a user interface on one or more display screens.

Figure 9:
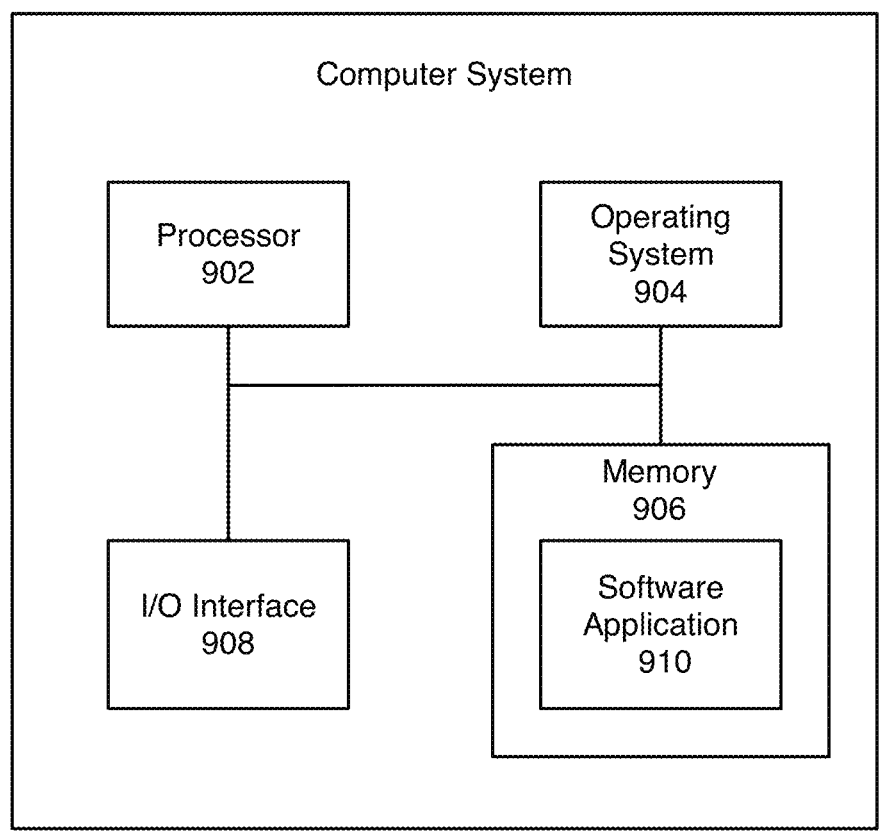
FIG. 9 is a block diagram of an example computer system, which may be used for some implementations described herein.

FIG. 9 is a block diagram of an example computer system 900, which may be used for some implementations described herein. For example, computer system 900 may be used to implement server device 804 of FIG. 8 and/or system 102 of FIG. 1, as well as to perform embodiments described herein. In some implementations, computer system 900 may include a processor 902, an operating system 904, a memory 906, and an input/output (I/O) interface 908. In various implementations, processor 902 may be used to implement various functions and features described herein, as well as to perform the method implementations described herein. While processor 902 is described as performing implementations described herein, any suitable component or combination of components of computer system 900 or any suitable processor or processors associated with computer system 900 or any suitable system may perform the steps described. Implementations described herein may be carried out on a user device, on a server, or a combination of both.

Computer system 900 also includes a software application 910, which may be stored on memory 906 or on any other suitable storage location or computer-readable medium. Software application 910 provides instructions that enable processor 902 to perform the implementations described herein and other functions. Software application may also include an engine such as a network engine for performing various functions associated with one or more networks and network communications. The components of computer system 900 may be implemented by one or more processors or any combination of hardware devices, as well as any combination of hardware, software, firmware, etc.

For ease of illustration, FIG. 9 shows one block for each of processor 902, operating system 904, memory 906, I/O interface 908, and software application 910. These blocks 902, 904, 906, 908, and 910 may represent multiple processors, operating systems, memories, I/O interfaces, and software applications. In various implementations, computer system 900 may not have all of the components shown and/or may have other elements including other types of components instead of, or in addition to, those shown herein.

Although the description has been described with respect to particular embodiments thereof, these particular embodiments are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium (also referred to as a machine-readable storage medium) for use by or in connection with the instruction execution system, apparatus, or device. Particular embodiments can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

Particular embodiments may be implemented by using a programmable general purpose digital computer, and/or by using application specific integrated circuits, programmable logic devices, field programmable gate arrays, optical, chemical, biological, quantum or nanoengineered systems, components and mechanisms. In general, the functions of particular embodiments can be achieved by any means as is known in the art. Distributed, networked systems, components, and/or circuits can be used. Communication, or transfer, of data may be wired, wireless, or by any other means.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A system comprising:
   one or more processors; and
   logic encoded in one or more non-transitory computer-readable storage media for execution by the one or more processors and when executed operable to cause the one or more processors to perform operations comprising:
   obtaining at least one video of at least one object performing at least one action;
   displaying a plurality of portions of the at least one video in a user interface, wherein the plurality of portions are displayed together in the at least one video in the user interface;
   displaying a plurality of annotation tracks in the user interface, wherein each annotation track of the plurality of annotation tracks shows one or more annotations that describe one or more of the at least one object and the at least one action in the at least one video, wherein a first portion of the plurality of portions of the at least one video includes the at least one object, wherein a first annotation track of the plurality of annotation tracks is associated with the first portion, wherein a second portion of the plurality of portions of the at least one video includes the at least one action, wherein a second annotation track of the plurality of annotation tracks is associated with the second portion, and wherein the plurality of annotation tracks are displayed in the user interface separately from the first portion and the second portion of the at least one video; and
   obtaining the one or more annotations based on the plurality of annotation tracks.

2. The system of claim 1, wherein the logic when executed is further operable to cause the one or more processors to perform operations comprising:
   parsing the at least one video into a plurality of segments;
   identifying one or more segments for the at least one object; and
   associating each of the one or more segments with the at least one object.

3. The system of claim 1, wherein the logic when executed is further operable to cause the one or more processors to perform operations comprising:
   parsing the at least one video into a plurality of segments;
   identifying one or more segments for the at least one action; and
   associating each of the one or more segments with the at least one action.

4. The system of claim 1, wherein the logic when executed is further operable to cause the one or more processors to perform operations comprising enabling a user to selectively annotate one or more of the at least one object and the at least one action in the at least one video based on at least one corresponding annotation track of the plurality of annotation tracks.

5. The system of claim 1, wherein the at least one video comprises a plurality of videos, and wherein the logic when executed are further operable to cause the one or more processors to perform operations comprising enabling a user to annotate a plurality of videos of a same object to provide the one or more annotations.

6. The system of claim 1, wherein the logic when executed is further operable to cause the one or more processors to perform operations comprising generating training data from the at least one video and the one or more annotations.

7. The system of claim 1, wherein the one or more annotations include one or more of object information, localization information, and action information.

8. A non-transitory computer-readable storage medium with program instructions stored thereon, the program instructions when executed by one or more processors are operable to cause the one or more processors to perform operations comprising:
   obtaining at least one video of at least one object performing at least one action;
   displaying a plurality of portions of the at least one video in a user interface wherein the plurality of portions are displayed together in the at least one video in the user interface;

displaying a plurality of annotation tracks in the user interface, wherein each annotation track of the plurality of annotation tracks shows one or more annotations that describe one or more of the at least one object and the at least one action in the at least one video, wherein a first portion of the plurality of portions of the at least one video includes the at least one object, wherein a first annotation track of the plurality of annotation tracks is associated with the first portion, wherein a second portion of the plurality of portions of the at least one video includes the at least one action, wherein a second annotation track of the plurality of annotation tracks is associated with the second portion, and wherein the plurality of annotation tracks are displayed in the user interface separately from the first portion and the second portion of the at least one video; and obtaining the one or more annotations based on the plurality of annotation tracks.

9. The computer-readable storage medium of claim 8, wherein the instructions when executed are further operable to cause the one or more processors to perform operations comprising:

parsing the at least one video into a plurality of segments;

identifying one or more segments for the at least one object; and associating each of the one or more segments with the at least one object.

10. The computer-readable storage medium of claim 8, wherein the instructions when executed are further operable to cause the one or more processors to perform operations comprising:

parsing the at least one video into a plurality of segments;

identifying one or more segments for the at least one action; and associating each of the one or more segments with the at least one action.

11. The computer-readable storage medium of claim 8, wherein the instructions when executed are further operable to cause the one or more processors to perform operations comprising enabling a user to selectively annotate one or more of the at least one object and the at least one action in the at least one video based on at least one corresponding annotation track of the plurality of annotation tracks.

12. The computer-readable storage medium of claim 8, wherein the at least one video comprises a plurality of videos, and wherein the instructions when executed are further operable to cause the one or more processors to perform operations comprising enabling a user to annotate a plurality of videos of a same object to provide the one or more annotations.

13. The computer-readable storage medium of claim 8, wherein the instructions when executed are further operable to cause the one or more processors to perform operations comprising generating training data from the at least one video and the one or more annotations.

14. The computer-readable storage medium of claim 8, wherein the one or more annotations include one or more of object information, localization information, and action information.

15. A computer-implemented method comprising:

obtaining at least one video of at least one object performing at least one action;

displaying a plurality of portions of the at least one video in a user interface, wherein the plurality of portions are displayed together in the at least one video in the user interface;

displaying a plurality of annotation tracks in the user interface, wherein each annotation track of the plurality of annotation tracks shows one or more annotations that describe one or more of the at least one object and the at least one action in the at least one video, wherein a first portion of the plurality of portions of the at least one video includes the at least one object, wherein a first annotation track of the plurality of annotation tracks is associated with the first portion, wherein a second portion of the plurality of portions of the at least one video includes the at least one action, wherein a second annotation track of the plurality of annotation tracks is associated with the second portion, and wherein the plurality of annotation tracks are displayed in the user interface separately from the first portion and the second portion of the at least one video; and obtaining the one or more annotations based on the plurality of annotation tracks.

16. The method of claim 15, further comprising:

parsing the at least one video into a plurality of segments;

identifying one or more segments for the at least one object; and associating each of the one or more segments with the at least one object.

17. The method of claim 15, further comprising:

parsing the at least one video into a plurality of segments;

identifying one or more segments for the at least one action; and associating each of the one or more segments with the at least one action.

18. The method of claim 15, further comprising enabling a user to selectively annotate one or more of the at least one object and the at least one action in the at least one video based on at least one corresponding annotation track of the plurality of annotation tracks.

19. The method of claim 15, wherein the at least one video comprises a plurality of videos, and wherein the method further comprises enabling a user to annotate a plurality of videos of a same object to provide the one or more annotations.

20. The method of claim 15, further comprising generating training data from the a least one video and the one or more annotations.

* * * * *